US012034215B1

(12) United States Patent
Wilson et al.

(10) Patent No.: US 12,034,215 B1
(45) Date of Patent: Jul. 9, 2024

(54) MICROWAVE SLOTTED-ARRAY ANTENNA

(71) Applicants: Douglas Mark Wilson, King George, VA (US); Blake Charles Duff, Fredericksburg, VA (US); Jon Cameron Pouncey, Fredericksburg, VA (US)

(72) Inventors: Douglas Mark Wilson, King George, VA (US); Blake Charles Duff, Fredericksburg, VA (US); Jon Cameron Pouncey, Fredericksburg, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 18/079,585

(22) Filed: Dec. 12, 2022

(51) Int. Cl.
*H01Q 21/00* (2006.01)
*H01Q 1/42* (2006.01)

(52) U.S. Cl.
CPC ........... *H01Q 21/0056* (2013.01); *H01Q 1/42* (2013.01)

(58) Field of Classification Search
USPC .......................................................... 343/771
See application file for complete search history.

(56) References Cited

U.S. PATENT DOCUMENTS 6,972,727 B1 * 12/2005 West .................. H01Q 21/0056 343/778
7,535,428 B2 * 5/2009 Koslover ............... H01Q 13/02 343/762
10,103,448 B1 * 10/2018 Izadian ................ H01Q 21/005
10,613,216 B2 * 4/2020 Vacanti .............. H01Q 21/0043
2022/0352638 A1 * 11/2022 Vollbracht ........... H01Q 21/005
2023/0194703 A1 * 6/2023 Doyle .................. H01Q 21/005 342/70

FOREIGN PATENT DOCUMENTS

CN 103151620 A * 6/2013
CN 103151620 B 6/2013 ............. H01Q 21/00
CN 110148839 A * 8/2019 ............... H01Q 1/50
CN 112086747 A * 12/2020 ............... H01Q 1/00
CN 112086747 B 12/2020 ............... H01Q 1/50
CN 110148839 B 4/2021 ............... H01Q 1/50
CN 114725687 A * 7/2022
CN 114725687 A 7/2022 ............. H01Q 13/10
JP 2005204344 A * 7/2005

* cited by examiner

*Primary Examiner* — Hoang V Nguyen
*Assistant Examiner* — Brandon Sean Woods
(74) *Attorney, Agent, or Firm* — Gerhard W. Thielman

(57) ABSTRACT

A slotted waveguide array (SWA) antenna is provided for emitting electromagnetic radiation. The antenna includes a base, a pair of brackets, a pair of spars, a plurality of waveguides, and a radome. The base provides longitudinal and lateral support for the antenna on a platform. The brackets are disposed at longitudinally opposite ends on the base. The spars connect the brackets and are disposed at laterally opposite ends of the base. The waveguides are disposed in stagger array. Each waveguide has a pair of broad walls and a pair of side walls that share longitudinal edges. The broad wall is wider than the side wall. The broad wall includes elliptical slots penetrating each waveguide. The stagger array arranges first and second waveguides share respective first and second longitudinal edges. The radome covers the waveguides and connects to the pair of spars.

7 Claims, 11 Drawing Sheets

MICROWAVE SLOTTED-ARRAY ANTENNA

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to antennas. In particular, the invention relates to high power microwave (HPM) antennas.

Efficient and directive radiation of high power radio frequency (RF) from an antenna is one of the most critical stages of an HPM system. Most recent conventional high power microwave (HPM) antennas comprise reflectors, horns, and horn arrays: deep and heavy systems unsuitable for small volumes and conforming to curved surfaces. With the constant push to package HPM systems into more compact packages, a need naturally emerged for an effective, conformal, and shallow HPM antenna.

SUMMARY

Conventional waveguide antennas yield disadvantages addressed by various exemplary embodiments of the present invention. In particular, various exemplary embodiments provide a slotted waveguide array (SWA) antenna emitting electromagnetic radiation. The antenna includes a base, a pair of brackets, a pair of spars, a plurality of waveguides, and a radome. The base provides longitudinal and lateral support for the antenna on a platform. The brackets are disposed at longitudinally opposite ends on the base. The spars connect the brackets and are disposed at laterally opposite ends of the base.

The waveguides are disposed in stagger array. Each waveguide has a pair of broad walls and a pair of side walls that share longitudinal edges. The broad wall is wider than a side wall and includes elliptical slots penetrating each waveguide. The stagger array arranges first and second waveguides share respective first and second edges. The radome covers the waveguides and connects to the pair of spars. Other various embodiments alternatively or additionally provide for the side wall featuring additional elliptical slots.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

Figure 1:
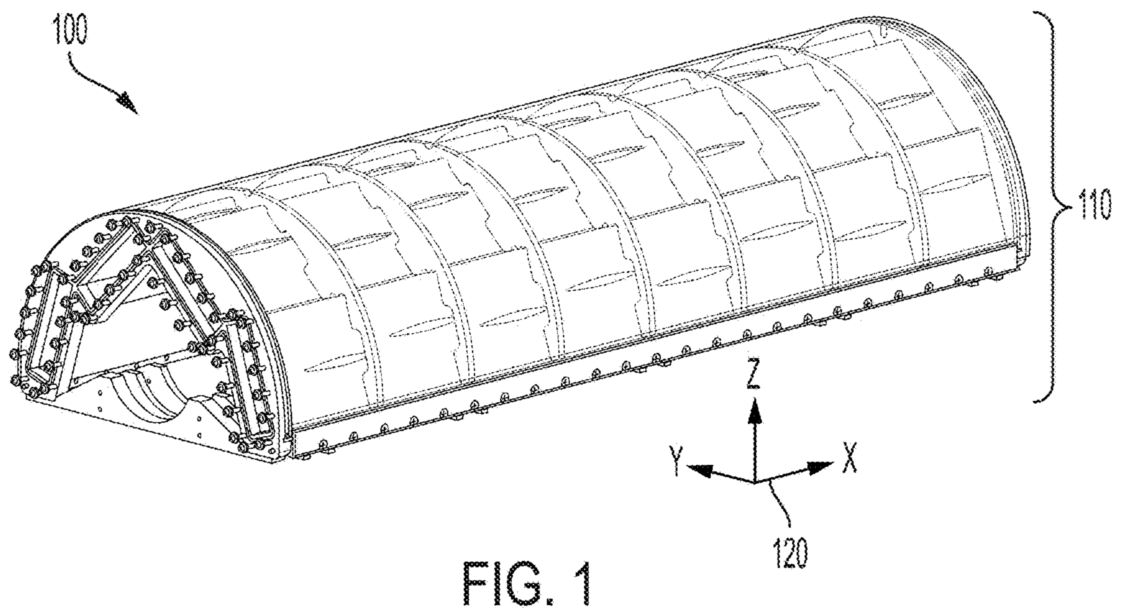
FIG. 1 is an isometric view of the conformal slotted waveguide array (SWA)

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The disclosure generally employs quantity units with the following abbreviations: length in meters (m) or inches ("), mass in grams (g), time in seconds (s), angles in degrees (°), force in newtons (N), temperature in kelvins (K), energy in joules (J), power in watts (W), signal strength in decibels (dB) and frequencies in hertz (Hz). Supplemental measures can be derived from these, such as density in grams-per-cubic-centimeters ($g/cm^3$), moment of inertia in gram-square-centimeters ($kg\text{-}m^2$), electric field (voltage potential) field stress in kilovolts-per-centimeter (kV/cm) and the like.

The objective of this disclosure is to provide an antenna design to radiate at peak power levels of ≥1 GW with low dispersion and high gain from a shallow volume and curved aperture. The frequencies include microwave, so that the antenna to be described herein corresponds to emissions in the microwave portion of the electromagnetic (EM) spectrum. The antenna is designed to be conformal to any arbitrary non-planar shape. Exemplary embodiments provide an antenna that radiates linearly polarized high power microwave (HPM) pulses into free space from a microwave source through a combination of broad wall and side wall slots cut into the surfaces of waveguides while conforming to a curved aperture. The antenna array may also be enclosed in a radio frequency (RE) transparent radome and dielectrically loaded.

The present disclosure teaches a wideband slotted waveguide array (SWA) antenna comprising four rectangular waveguides rotated off-plane to be conformal to a curved aperture. A half-circle arc cylindrical Quonset hut geometry constitutes an exemplary embodiment of this design. This off-plane rotation exposes a side wall and broad wall of each waveguide, enabling both to potentially radiate. The emission frequencies correspond to the microwave spectrum with wavelengths between 1 mm (300 GHz) and 1 m (300 MHz).

Carefully positioned slots of any desired shape are cut into each of these walls. Fed at one end and shorted on the other end, the exemplary antenna employs a combination of broad and side wall slots to effectively radiate high power microwaves in the broadside direction. The development of the curved aperture SWA began in 2021 as part of a Naval Surface Warfare Center Dahlgren Division (NSWCDD) effort to develop a very shallow compact HPM antenna conformal to a curved surface.

FIG. 1 shows an isometric assembly view 100 of a Quonset hut geometry for an exemplary slotted waveguide array (SWA) antenna 110. A Cartesian coordinate system or compass rose 120 exhibits orientation—in particular X for longitudinal, Y for lateral and Z for azimuthal. The mechanically passive antenna 110 has a geometry of a half-cylinder with a half-circle arc cross-section, with the axial centerline corresponding to the longitudinal (X) direction. The overall physical length of the antenna 110 is 150 cm and the width is 56 cm. The antenna 110 weighs about 180 kg when fully assembled and dielectrically loaded. This configuration is merely exemplary and not limiting.

Figure 2:
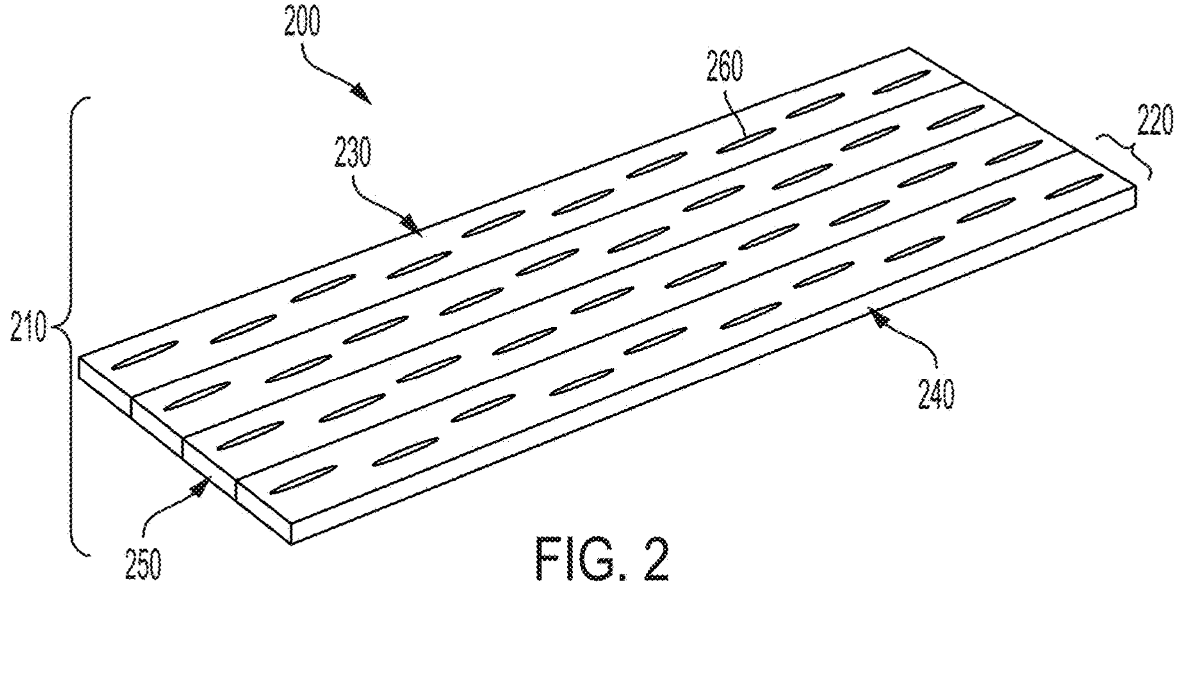
FIG. 2 is an isometric view of a planar slotted waveguide array.

FIG. 2 shows an isometric view 200 of an SWA panel 210 comprising four slotted waveguides 220 arranged abreast. Each waveguide 220 has a pair of planar broad walls (or faces) 230 and a pair of side walls (or longitudinal edges) 240 that define a channel 250. The waveguides 220 are preferably composed of aluminum and exhibit the shape of transverse electric one-ten ($TE_{10}$) mode hollow elongated rectangular tubes. Alternatively, the waveguides 220 can be manufactured from macromer resin such as for stereolithography and electroplated with a conductive metal, such as nickel.

Staggered elliptical slots 260 are disposed along the length of the planar broad walls 230, penetrating through the waveguide's thickness 0.125". The exemplary waveguide 220 is substantially flat (i.e., having minimal curvature). The slots 260 emit EM waves to directionally propagate an EM signal. The broad walls 230 and the side walls 240 extend longitudinally parallel to the X axis for the antenna 110.

Artisans of ordinary skill will recognize dielectrical loading entails filling the volume within the radome 310 with a solid or liquid non-conductive material. For example, transformer oil can be used to raise the electric field levels the SWA antenna 110 can withstand without internal electrical breakdown or arcing. Artisans will also recognize that to reduce variations in antenna emission, edges are preferably smooth, including the slots 260.

Figure 3:
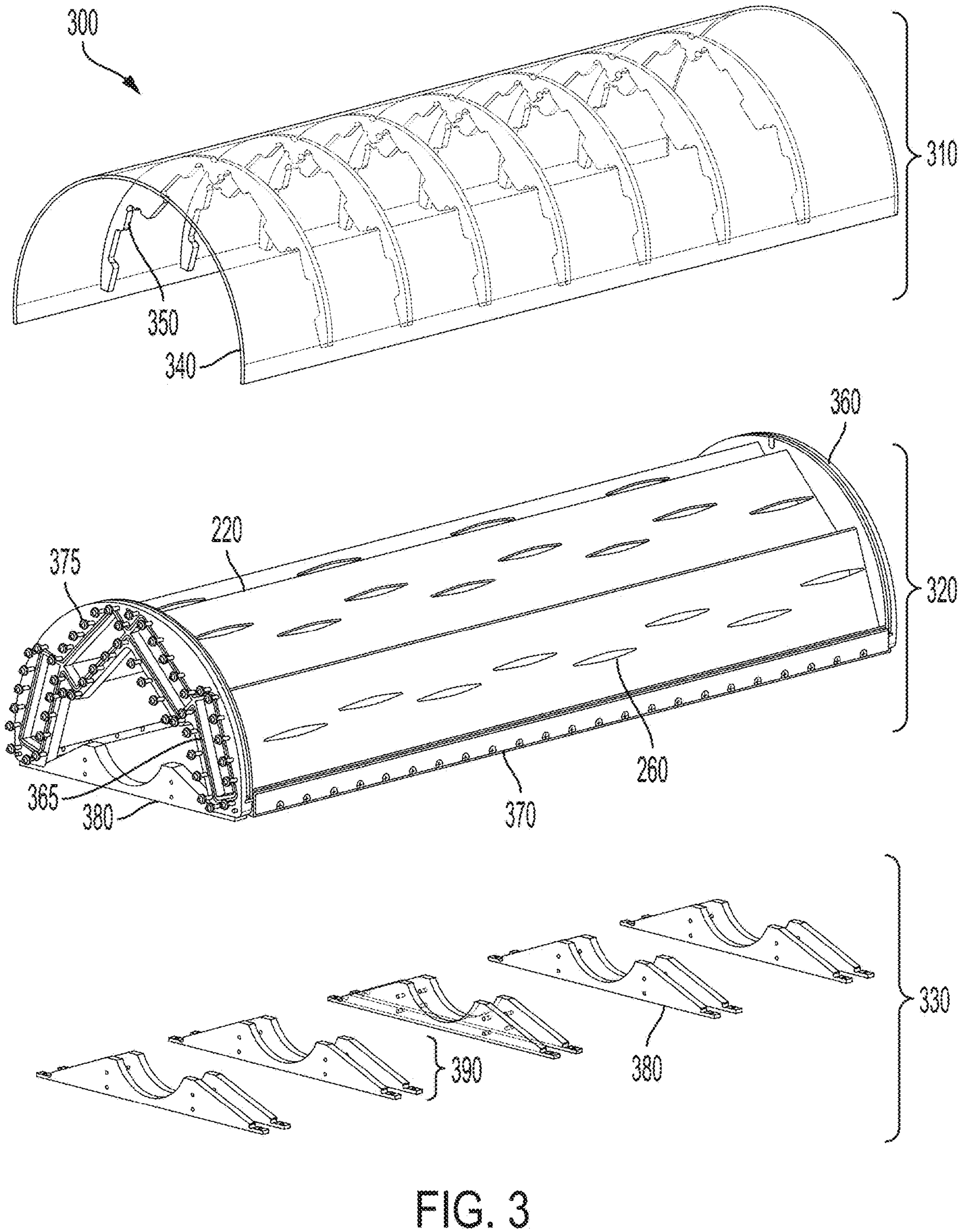
FIG. 3 is an isometric exploded view of SWA components.

FIG. 3 shows an isometric exploded view 300 of components for the SWA antenna 110. These components can be divided into sub-assemblies: a radome 310, a waveguide composition 320 and a base mount 330. The radome 310 includes a half-cylinder cover 340 supported internally by ribs 350. The waveguide composition 320 includes a fore-and-aft pair of hemispherical brackets 360, each with rectangular cavities 365, and a port-and-starboard pair of spars 370. The cover 340 extends to connect between the spars 370. A plurality of fasteners 375 connect the brackets 360 to the waveguides 220.

The base mount 330 comprises lateral stiffeners 380 that when paired form a support pad 390. The base mount 330 rests on a floor or else a portable support platform and forms a longitudinal and lateral perimeter. The materials for the radome cover 340 and rib 350 are high density polyethylene $(C_2H_4)_n$), but any low-loss plastic material would be suitable. The cover 340 constitutes a 0.125" thick plastic sheet radially bent around the brackets 360, and the ribs 350 are machined from bulk material. The stiffeners 380 and spars 370 are machined from bulk aluminum metal.

Figure 4:
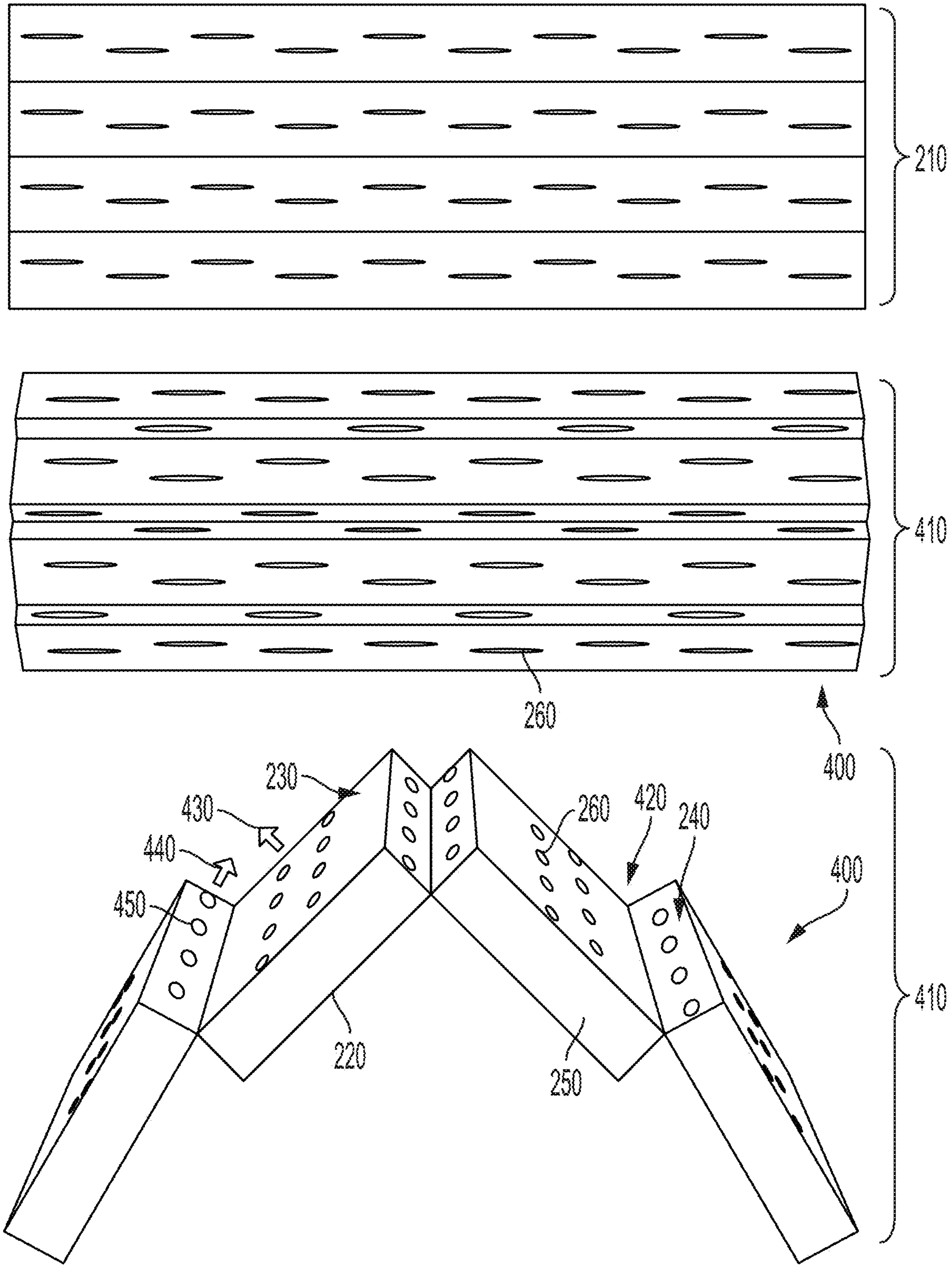
FIG. 4 is a set of plan and quasi-isometric views of a set of slotted waveguides.

FIG. 4 shows a plan and quasi-isomeric views 400 of the waveguides 220 arranged as a panel 210 and a conformal stagger array 410, such as in the waveguide composition 320. The idea behind the curved aperture SWA antenna 110 was first conceived as an attempt to fit a panel 210 for a standard slotted waveguide array into an electrically small volume with curved surfaces. The waveguides 220 are arranged such that the linear corners of a side wall 240 of one waveguide 220 touch along a planar broad wall 230 of an adjacent waveguide 220 as an edge joint 420.

At the apex of the array 410, an adjacent pair of broad walls 230 connect together at their mutual edges. Each broad wall 230 has a broad normal vector 430 from which EM waves can radiate from its associated elliptical slots 260. For reasons explained further, each side wall 240 has a side normal vector 440 from which associated elliptical slots 450 can radiate. The slots 260 and 450 penetrate their respective broad and side walls 230 and 240 normal to the wall surfaces. The slots 260 and 450 can be identical in size and shape.

Figure 5A:
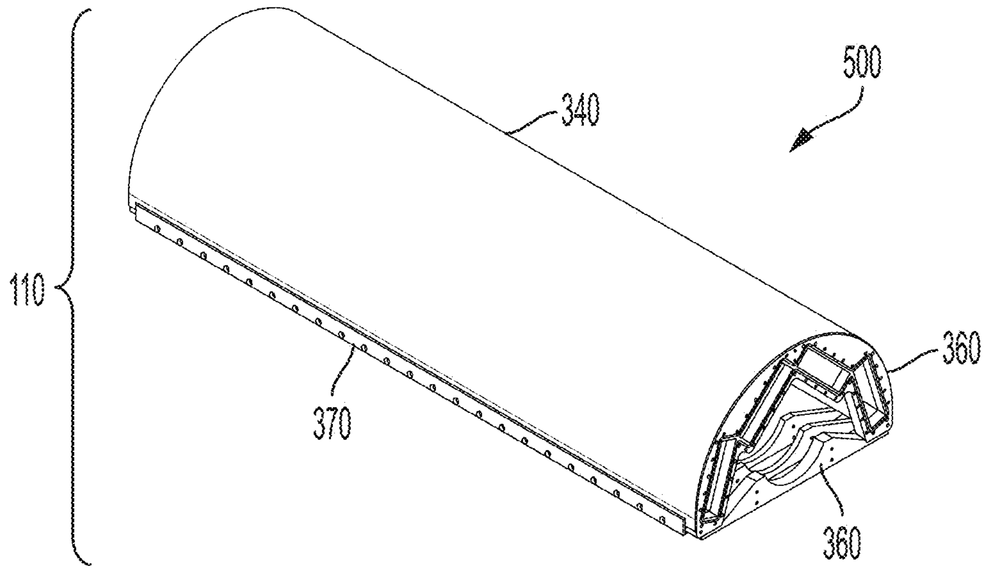
FIGS. 5A and 5B are isometric views of the SWA antenna.
Figure 5B:
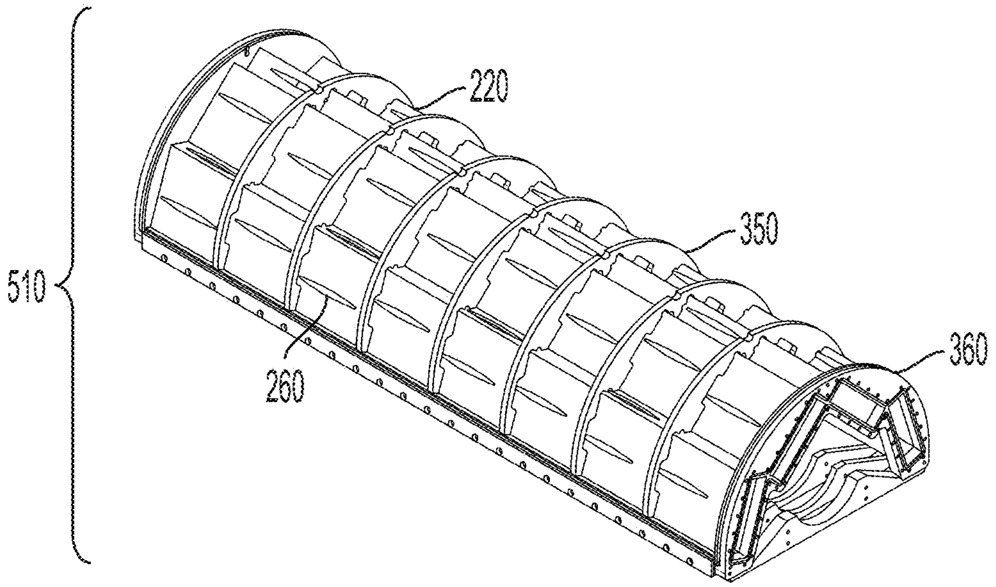
Figure 5C:
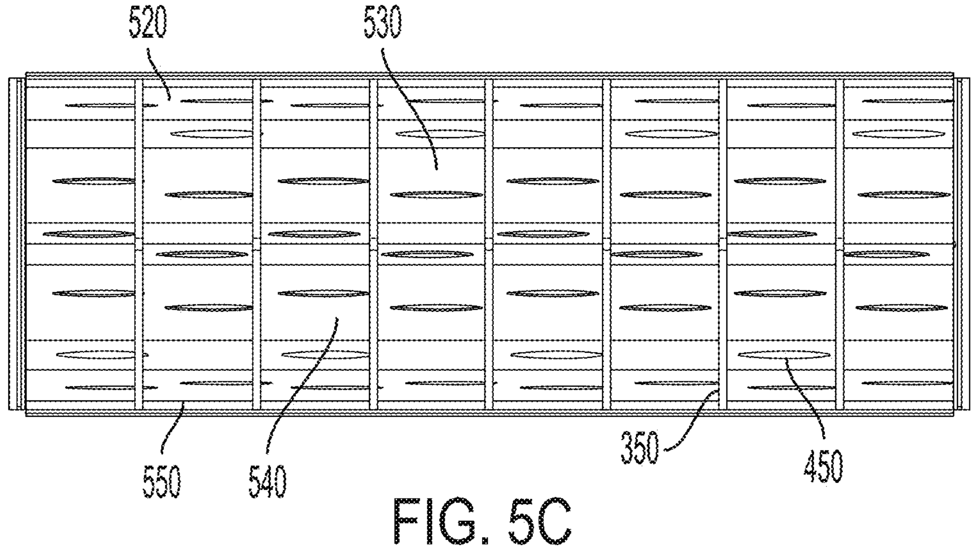
FIGS. 5C, 5D and 5E are plan and elevation views of that antenna.

FIGS. 5A, 5B, 5C, 5D and 5E show isometric, plan and elevation views of the SWA antenna 110 with and without the cover 340. FIG. 5A provides an isomeric view of the SWA antenna 110 showing the cover 340, brackets 360 and spars 370. FIG. 5B provides an isometric view of the antenna assembly 510 absent the cover 340 to reveal the waveguides 220 and ribs 350. FIG. 5C reveals an overhead plan view of the assembly 510 showing four waveguides 220 as custom inlets #1 520, #2 530, #3 540 and #4 550 ordered from top-to-bottom for this configuration.

Figure 5D:
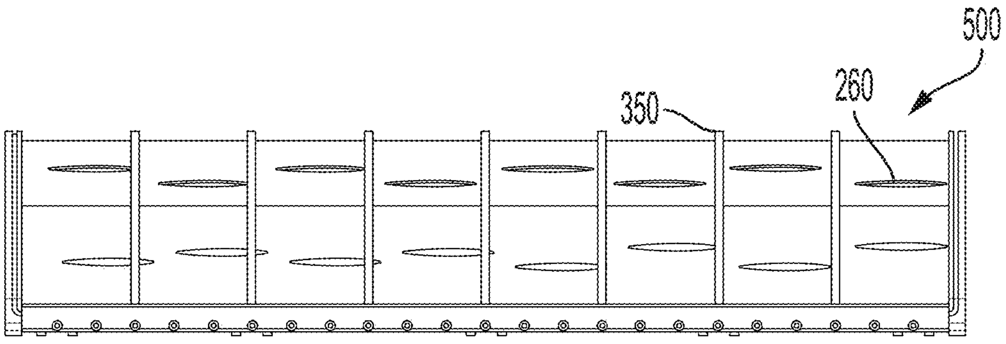
Figure 5E:
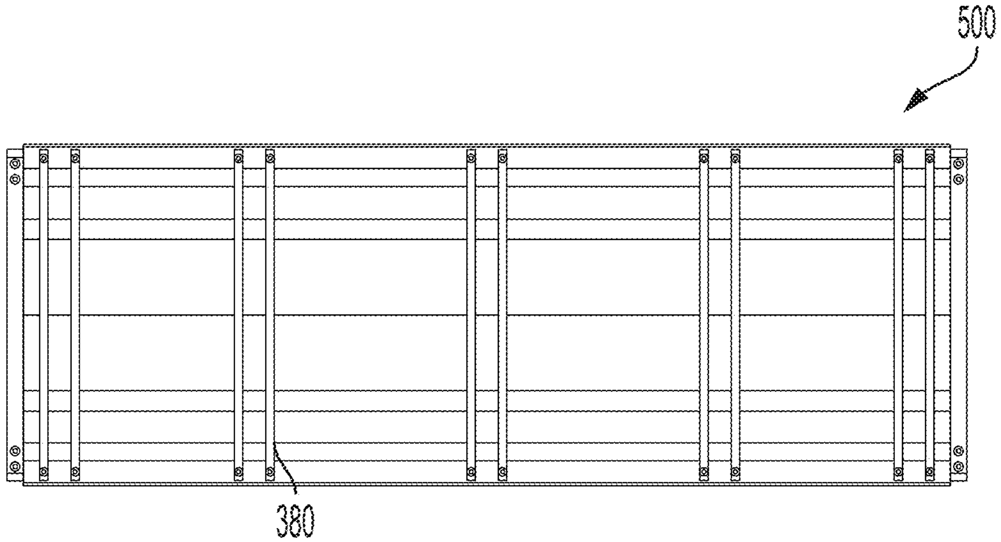
Figure 6A:
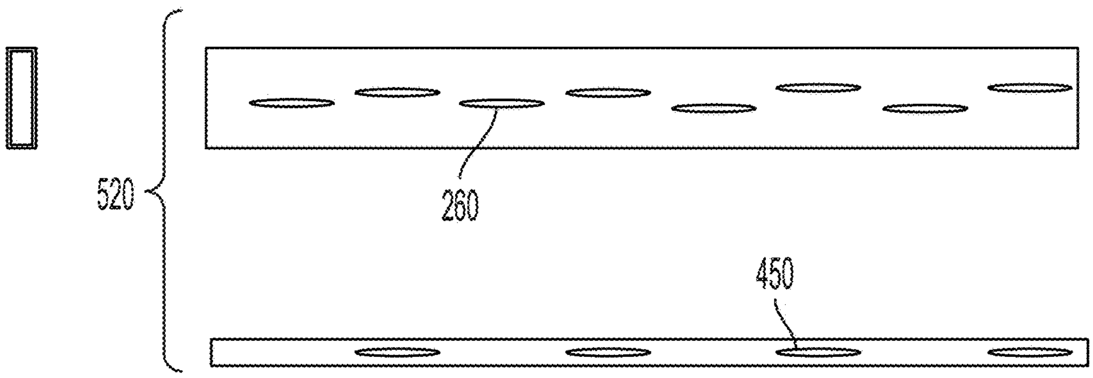
FIGS. 6A, 6B, 6C and 6D are plan and elevation views of the waveguides.
Figure 6B:
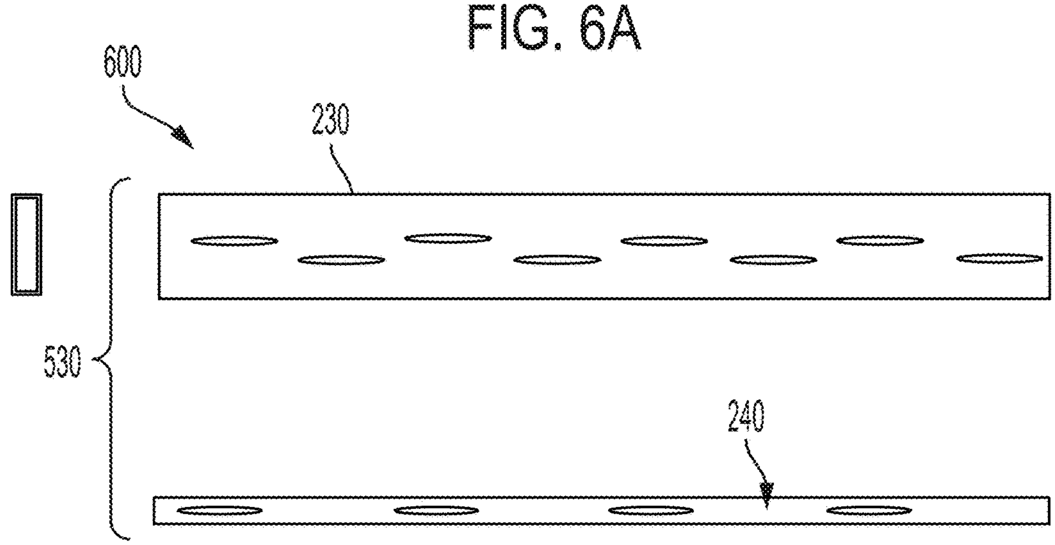
Figure 6C:
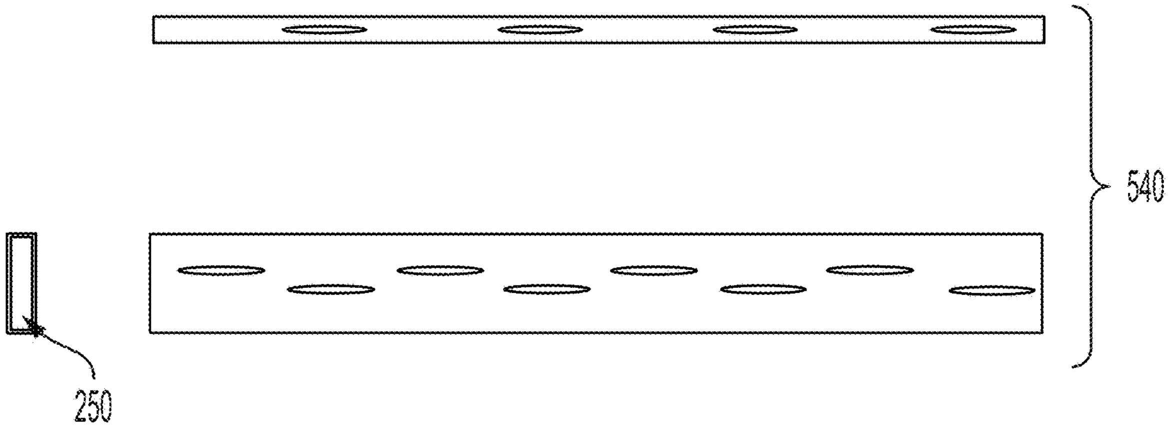
Figure 6D:
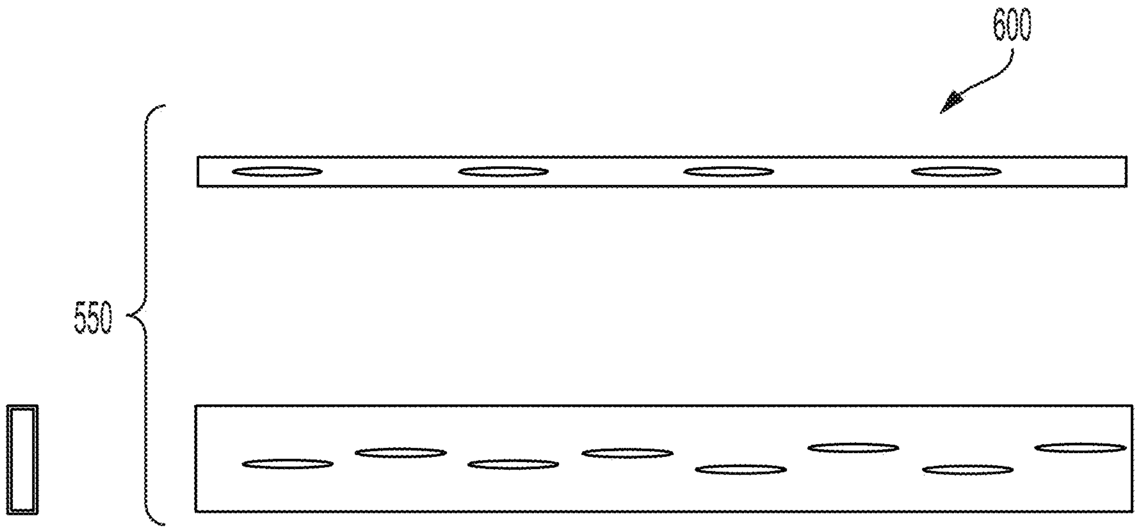

FIG. 5D presents an elevation view of the assembly 510. FIG. 5E presents an underneath plan view of assembly 510. The waveguides 220 (including #1 520, #2 530, #3 540 and #4 550) are 4.54" in length and 0.52" in width with walls 0.125" thick. The cover 340 is 4.66" in length and 0.91" in height. The ribs 350 and the stiffeners 380 are 0.038" thick.

FIGS. 6A, 6B, 6C and 6D show elevation views 600 of waveguides 220. The inlets have interior cross-section dimensions of 0.50" by 0.125". The numbered entities exhibit the same frame, but have distinct locations for their respective slots 260 and 450. Each slot 260 is between 0.436" and 0.45" in length and 0.04" in width. The interleaving slots 260 are separated from their centers by 0.55" longitudinally and by 0.099" laterally. The slots 450 are separated from their sensors by 1.10". The slots 260 start their centers from the inlet (at the forward bracket 360) for #1, #2, #3 and #4 at respective distances of 0.442", 0.373", 0.374", and 0.442". The slots 450 start their centers from the inlet for #1, #2, #3 and #4 at respective distances of 0.948", 0.329", 0.088", and 0.040". Artisans of ordinary skill will recognize that these dimensions are merely exemplary and not limiting.

Figure 7:
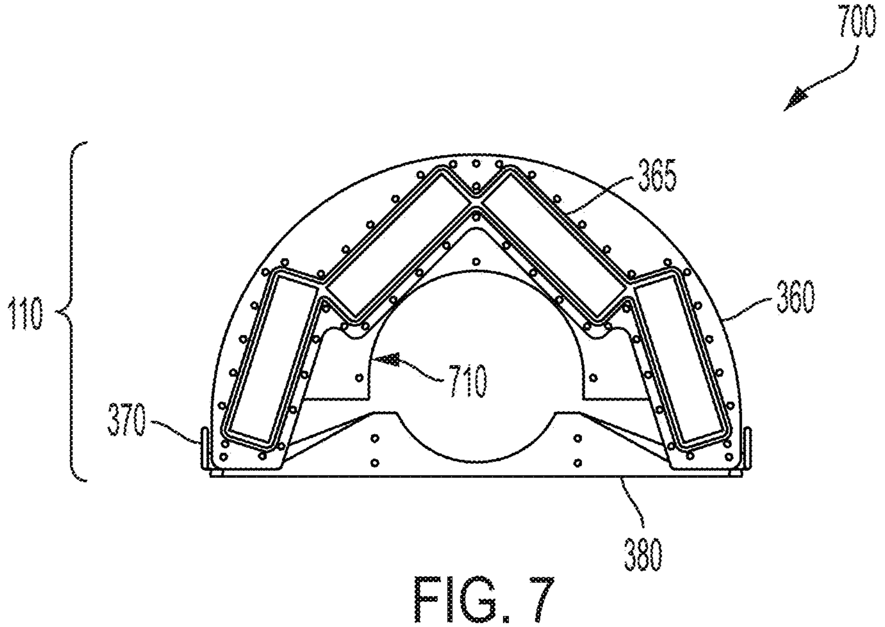
FIG. 7 is a front elevation view the SWA antenna.
Figure 8:
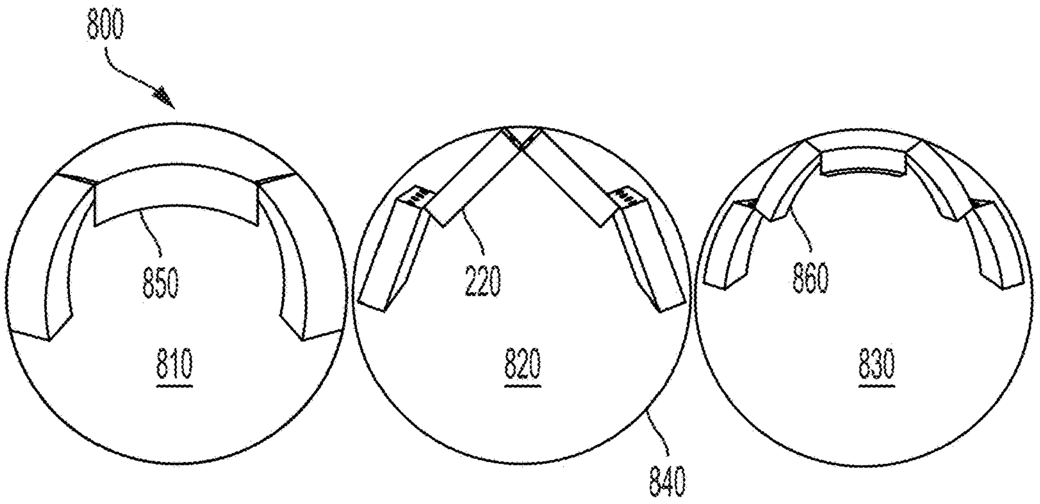
FIG. 8 is a quasi-elevation view of sets of slotted waveguides.

FIG. 7 shows an elevation view 700 of the SWA antenna 110 featuring its geometric profile. The rectangular cavities 365 that receive the waveguides 220 are ordered clockwise from bottom left as #1, #2, #3 and #4 corresponding to the waveguides in view 500. A hemispherical cutout 710 is visible as part of the aft bracket 360 and for scale has an exemplary hemispherical diameter of 0.65". FIG. 8 shows a quasi-elevation views 800 of various waveguide compositions. These geometries are identified as triple 810, quadruple 820 and quintuple 830 within a circular frame 840. The triple geometry 810 features a curved waveguide 850. The quadruple geometry 820 features the flat waveguide 220. The quintuple geometry 830 also features a curved waveguide 860, albeit narrower than the triple version waveguide 850.

To conform this array 410 to a curved surface as circle frame 840, the waveguides 220 could not be positioned in a standard two-dimensional plane configuration. Rotating the waveguides 220 with respect to one another to conform to the curved surface results in the normal vectors 430 of the broad walls 230 pointing in different directions, which has untoward directivity effects. To counteract this, elliptical slots 450 are cut into the newly exposed side walls 240 with side normal 440 to re-direct beams from each individual waveguide 220 back towards broad normal 430.

The slots 260 and 450 are also carefully repositioned with respect to the longitudinal center line of the planar surfaces of the broad walls 230 and with respect to each other to account for the difference in mutual coupling from off-plane locations. The staggered dispositioning of slots 260 on the broad wall 230 facilitates concurrent radiation of the nearby slots 450 on the side wall 240.

A curved aperture conformal slotted waveguide array (SWA) antenna 110 was simulated and optimized in commercially available computational electromagnetics (CEM) software using this disclosure's design methodology and fabricated from four dielectrically loaded rectangular half-height waveguides 220 for HPM applications. This exemplary antenna 110 possesses forty-eight elliptical slots 260 and 450 in total distributed among four waveguides 220. These are distributed as eight slots 260 on each broad wall 230 and four slots 450 on each side wall 240. Assuming a balanced in-phase input on all four rectangular ports at cavities 365 achieved with a four-way coaxial-to-waveguide coupler, the exemplary SWA antenna 110 achieves an impressive 65% aperture efficiency, which is comparable to a flat non-conformal slotted waveguide array, while occupying a much smaller confined space.

Figure 9:
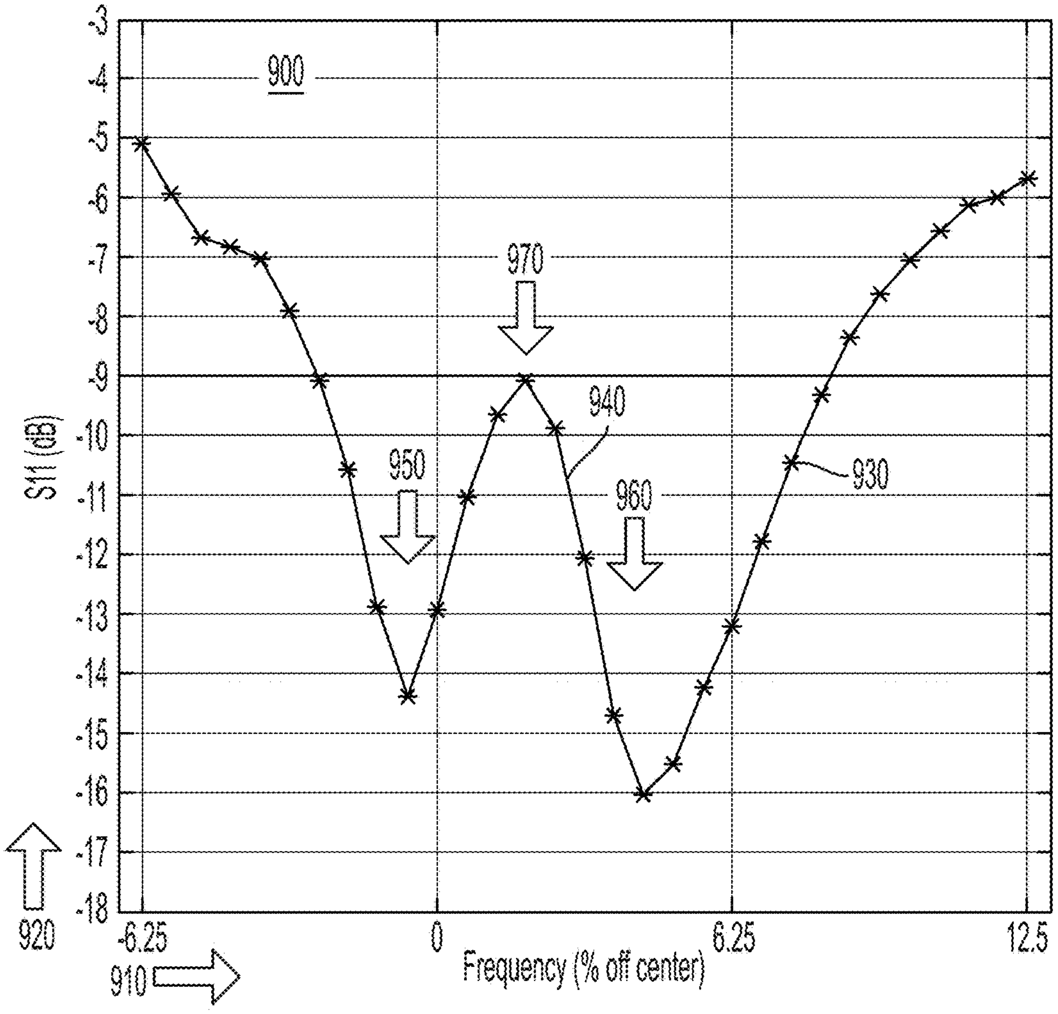
FIG. 9 is a graphical view of signal response to frequency deviation.

FIG. 9 shows a graphical view 900 of signal reflection plot. In particular, view 900 features an S-parameter plot of the S11 (reflection) viewed at the coaxial input port of the coupler attached to the slotted waveguide array 410. Frequency deviation 910 (percentage off-center) denotes the abscissa while S11 signal 920 (dB) presents the ordinate. Data points 930 plotted can be connected by a curve 940. The trace identifies two substantial decreases in signal of −14.6 dB at frequency minus one (−1) percent by arrow 950 and −16.1 dB at four (4) percent by arrow 960. A local maximum indicated by arrow 970 is situated between these minimums of −9 dB at about one-and-a-half (1½) percent.

Figure 10:
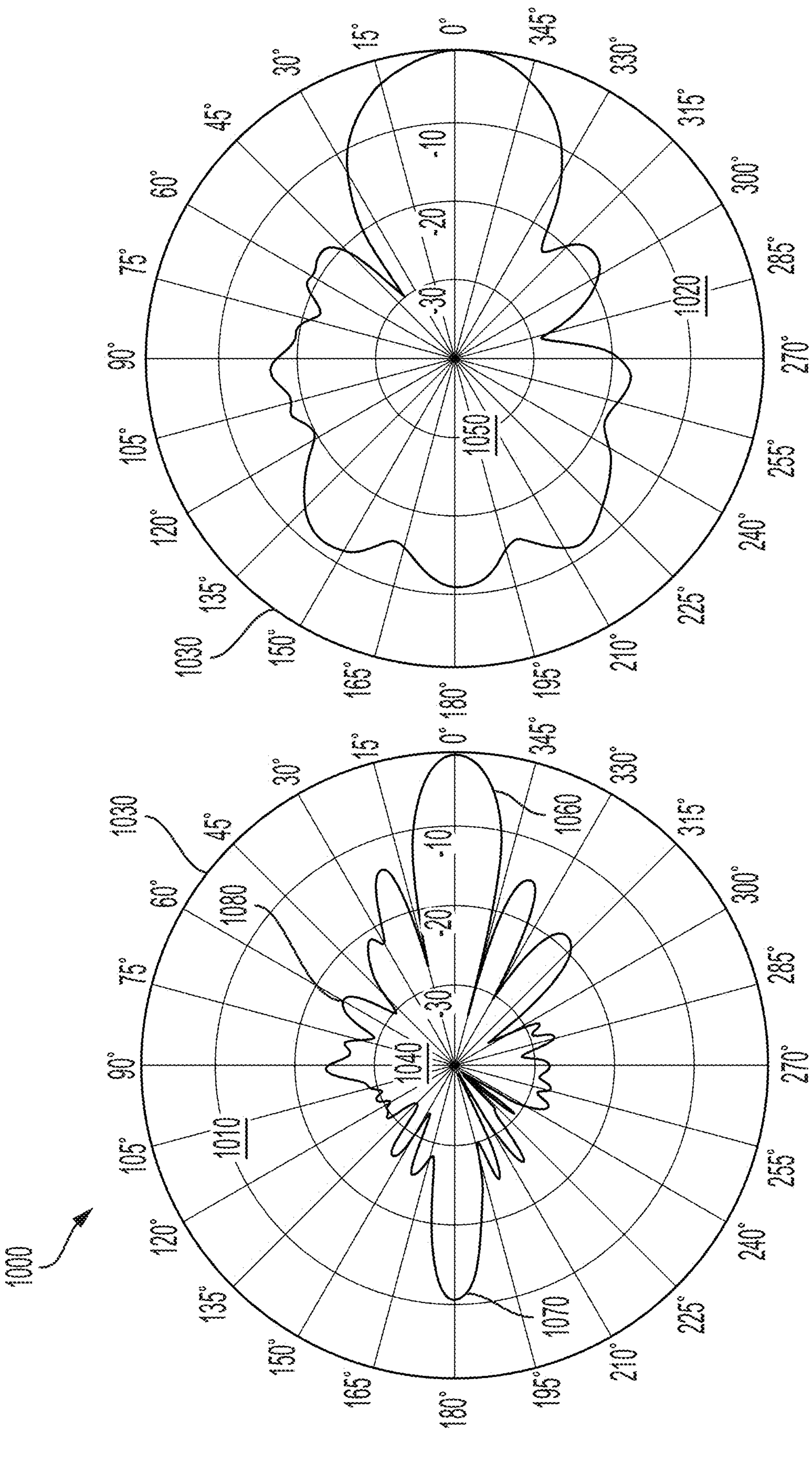
FIG. 10 is a set of polar graphical views of signal emission lobes.

FIG. 10 shows a circular plot view 1000 of simulated two-dimensional (2D) radiation pattern in the H-plane 1010 and E-plane 1020 normalized to maximum gain within a radial domain 1030. The H-plane plot 1010 features a first profile 1040, while the E-plane plot 1020 features a second profile 1050, both profiles 1040 and 1050 exhibiting a major lobe 1060 at 0°, a back lobe 1070 at 180° and side lobes 1080. The major lobes 1060 are normalized at 0 dB. The 3 dB beam width is 15.0° in the H-plane plot 1010 and 36.0° in the E-plane plot 1020. The back lobe 1070 is −12 dB down from the main lobe 1060 and the highest magnitude side lobes 1080 are −15 dB down.

The curved aperture SWA 110 has an 11.4% total 3 dB bandwidth with respect to maximum gain. The bandwidth is asymmetric, due to the lower cutoff frequency of the waveguide, enabling frequency tuning of 3.6% down and 7.8% up. As commonly observed in slotted waveguides, beam steering behavior naturally occurs with frequency tuning due to their dispersive properties. On the bottom end of the 3 dB bandwidth, the beam steers 8.5° back towards the feed end of the array and at the top of the bandwidth the beam steers 11° forward.

Figure 11:
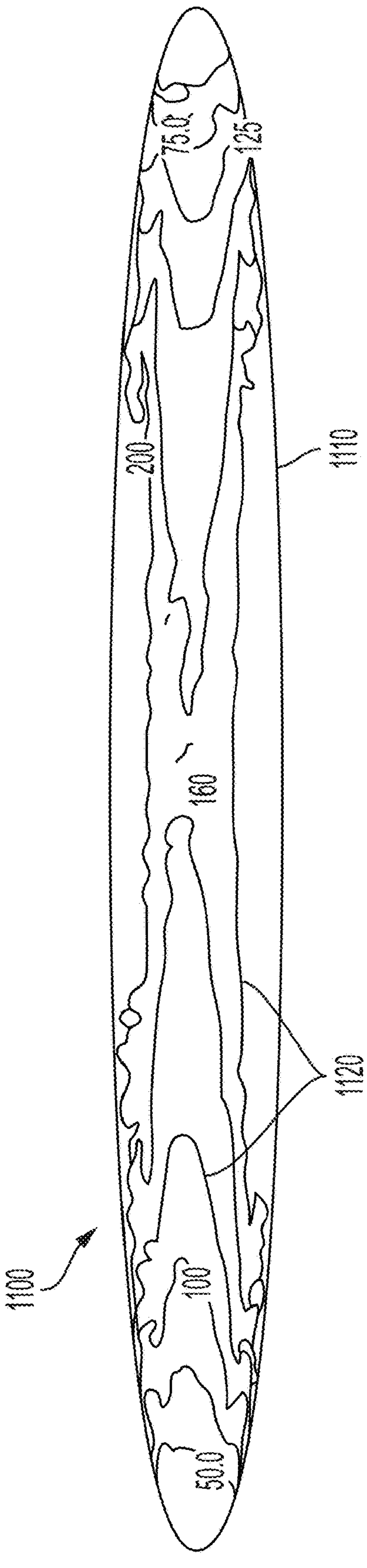
FIG. 11 is an isogrid view of electric field stress in a slot.
Figure 12:
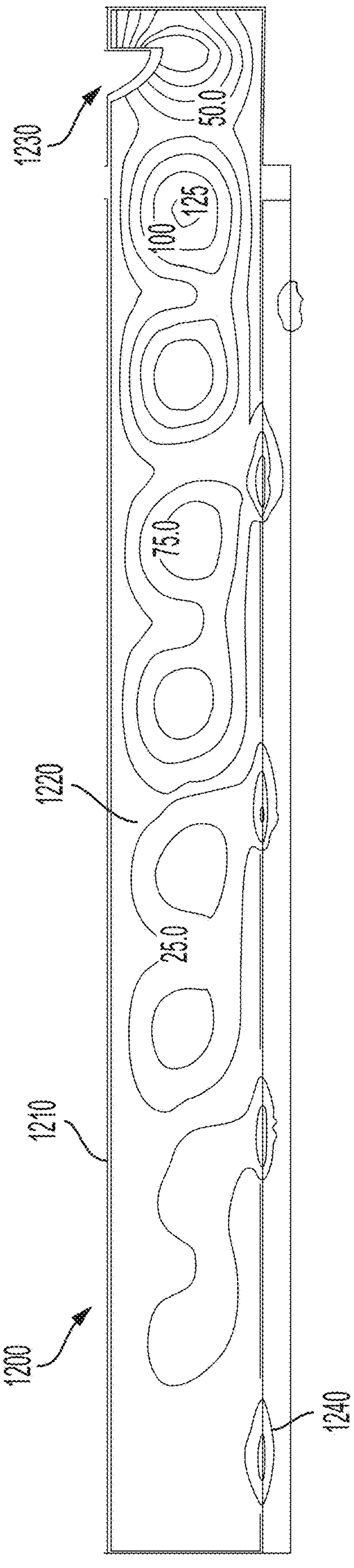
FIG. 12 is an isogrid rectilinear view of electric field stress in a waveguide.

FIG. 11 shows an isogrid view 1100 of an elliptical finite element analysis (FEA) solution plot 1110 of the normalized electric field inside the highest stress slot. Lines 1120 of constant E-field show gradients in electric field stress. FIG. 12 shows an isogrid view 1200 of a rectilinear FEA solution plot 1210 of the normalized electric field inside the highest stress waveguide. Lines 1220 of constant E-field show gradients at a power level of 1 GW at the center frequency.

With a 1 GW continuous wave (CW) input at the center frequency, the maximum electric field stress approaches 160 kV/cm in the slots 260 and 450 and 125 kV/cm in the waveguides 220. In air and under a static electric field these could be problematic values for electrical breakdown (threshold of ≥30 kV/cm), but the present dielectric load and a short pulse input are expected to be sufficient to prevent breakdown. In the environment outside of the radome's dielectric volume, the maximum E-field stress is expected to be 25 kV/cm, which is below the electric breakdown threshold in air.

Figure 13:
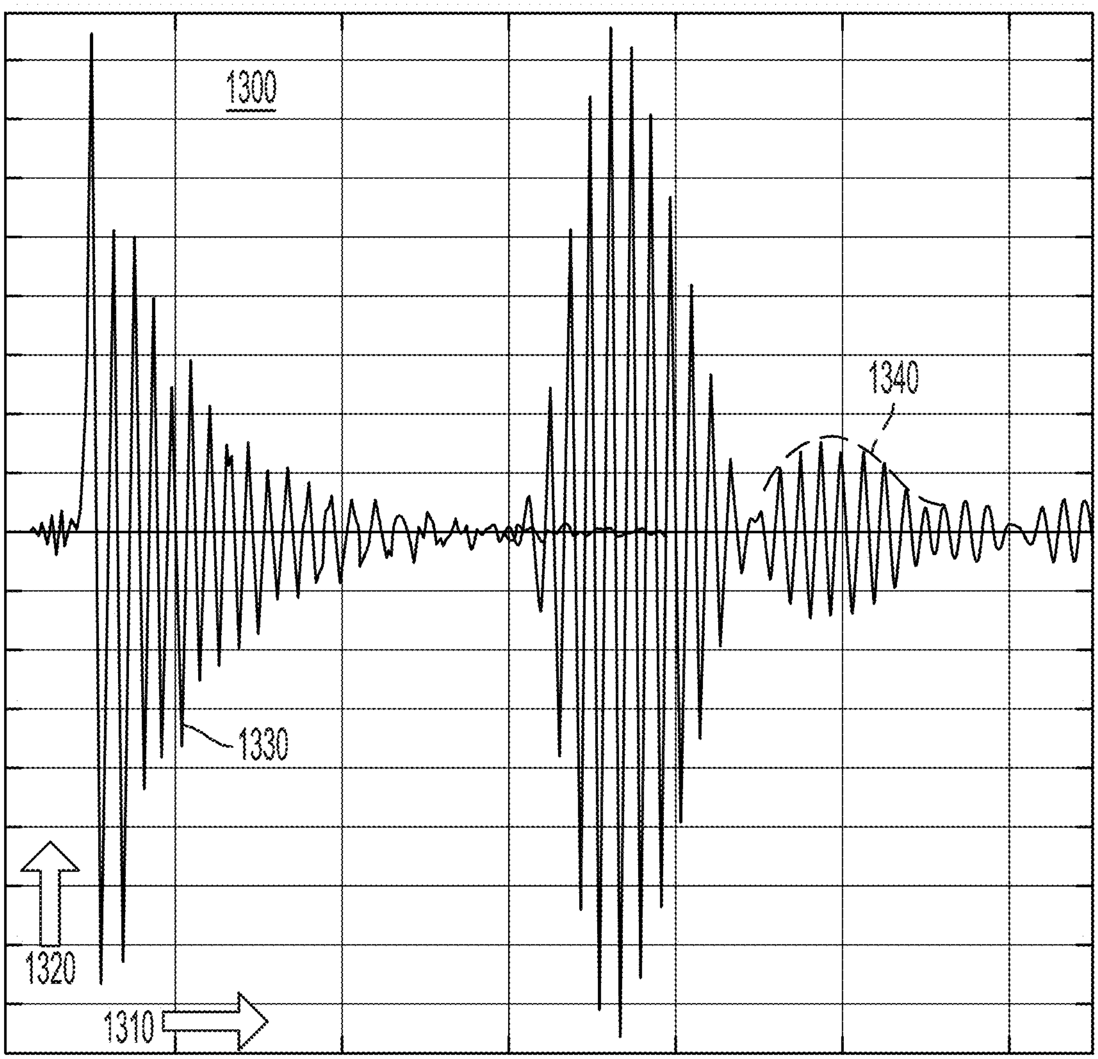
FIG. 13 is a graphical view of compressed input and dispersive output pulses.

FIG. 13 shows a graphical view 1300 of compressed ringdown style pulse and the resulting output pulse from the SWA antenna 110, illustrating its dispersive properties. Time 1310 denotes the abscissa while amplitude 1320 denotes the ordinate, which is not to scale. A high frequency wave 1330 shown by solid line has modulation waveform 1340 shown by dash curve.

The input waveform 1330 and the resulting output waveform 1340 located eight wavelengths above the SWA antenna 110 are determined by a transient electromagnetic wave solution. The approximately four additional cycles in the output waveform 1340 before achieving peak voltage demonstrates the dispersion due to the waveguide nature of the SWA antenna 110.

The curved aperture SWA 110 can also effectively radiate short pulse inputs as exhibited in plot view 1300. While dispersive effects exist due to the waveguide structure of the antenna, the effects can be minimized in practice by reducing the total amount of dispersive media the pulse must travel through to reach the SWA antenna 110.

Due to being a slotted waveguide array 410 fed from one end, this exemplary configuration also suffers from a non-zero turn-on time caused by the time required for the wavefront to travel from one end to the other and fully illuminate the waveguide 220. Despite these detrimental effects, the curved aperture SWA antenna 110 is capable of radiating short pulses with low-to-moderate dispersion. The design for the exemplary SWA antenna 110 was fabricated, characterized at low power in an anechoic chamber, and tested at high power.

The final design produced by this process includes a coupling device for feeding the antenna 110 the input power as well as the radome 310. Solid dielectric ribs 350 are included to structurally support the cover 340. The ribs 350 have material removed in areas of close proximity to the radiating slots 260 to reduce chances of electrical breakdown and to provide additional paths for air to escape when filling the SWA antenna 110 with dielectric material.

The curved aperture SWA antenna 110 can be used as a transmitting or receiving antenna in a wide range of industries that utilize microwave radiation including but not necessarily limited to radar, communications, laboratory research and development (R&D), etc. The device has been instrumental in the success of a directed energy effort at NSWCDD. Further development of this effort may potentially lead to a program of record, resulting in a potential mass production of the device to fulfill design requirements. Additionally, the high power microwave source this antenna was designed for is early in its development and the exemplary SWA antenna may be beneficial for future applications.

The closest alternatives that are similar to the design of the exemplary curved aperture SWA are patents for high power microwave antennas, e.g., U.S. Pat. Nos. 7,535,428 and 10,103,448; as well as Chinese patents CN112086747B, CN103151620B, CN110148839B and CN114725687A. None of these disclose a non-flat aperture conformal gigawatt power handling slot array as a panel 210, which as an exemplary geometry provides a novel technique for an SWA antenna 110 of high power microwave technology.

Additional modifications can be made to the waveguide geometry in an effort to further increase curved aperture conformity. For example, the broad walls 230 of the flat waveguide 220 can be warped into circular arc segments as arc channels 850 or 860 to match a circular cross-section frame 840 without perturbing the dominant $TE_{10}$ rectangular mode.

The waveguides 220, 850 or 860 can be dielectrically loaded for power handling purposes and to reduce their size, enabling the number of waveguides 220 to be a tunable variable for designing the array based on wavelength and relative dielectric constant. The circular cross sections 810, 820 and 830 clearly demonstrate the advantages of this design process, such as the extremely shallow profile leading to a minimal amount of volume consumed by the SWA antenna 110. The volume consumed by the antenna 110 is low value, enabling the higher value space in the center permits inclusion of a potential HPM source, pulsed power driver, and auxiliary systems.

The curved aperture SWA antenna 110 chosen to be fabricated was designed for greater than 1 GW of peak power. This was achieved by loading the waveguides with and immersing them in a high strength liquid dielectric as well as the shaping of sharp edges and corners to suppress localized field enhancements.

The array 410 is encased in an RF transparent, structural, and weatherproof enclosure as the radome 310. The SWA antenna 110 was carefully positioned inside the cover 340 to maximize the dielectric lensing effect for additional gain. The lensing is produced by the curved surface between dielectric and air, due to aperture shape and shift in relative dielectric constant.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A slotted waveguide array (SWA) antenna for emitting electromagnetic radiation, said antenna comprising:

a longitudinal and lateral base for supporting the antenna on a platform; a pair of brackets disposed at longitudinally opposite ends on said base; a pair of spars connecting said brackets and disposed at laterally opposite ends on said base; a plurality of waveguides disposed in stagger, wherein each waveguide has a pair of broad walls and a pair of side walls that share corresponding longitudinal edges and define a channel, each broad wall is wider than each side wall, said broad wall includes elliptical slots that penetrate each said waveguide, said stagger arranges a first and second waveguide of the said plurality of waveguides to share respective first and second longitudinal edges; and a radome for covering said plurality of waveguides and connecting to said pair of spars.

2. The antenna of claim 1, wherein side wall includes said elliptical slots in each said waveguide.

3. The antenna according to claim 1, wherein for each said waveguide, the said pair of broad walls are parallel and the said pair of side walls are parallel; and the said pair of broad walls are perpendicular with the said pair of side walls.

4. The antenna according to claim 3, wherein said plurality of waveguides is four.

5. The antenna according to claim 1, wherein said radome is a half-cylinder with a half-circle arc cross-section.

6. The antenna according to claim 1, wherein each said waveguide is composed of aluminum.

7. The antenna according to claim 1, wherein an enclosed volume between said radome and said base is filled with a dielectric material.

* * * * *